US012764506B2

(12) United States Patent
Palaniappan

(10) Patent No.: US 12,764,506 B2
(45) Date of Patent: Oct. 13, 2026

(54) PROVIDING BILLING SYSTEM AGNOSTIC ON-DEMAND NETWORK SLICING

(71) Applicant: T-Mobile USA, Inc., Bellevue, WA (US)

(72) Inventor: Murugappan Palaniappan, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 224 days.

(21) Appl. No.: 18/806,489

(22) Filed: Aug. 15, 2024

(65) Prior Publication Data

US 2026/0052360 A1 Feb. 19, 2026

(51) Int. Cl.
*H04W 4/24* (2024.01)
*H04W 8/20* (2009.01)
*H04W 48/16* (2009.01)

(52) U.S. Cl.
CPC ............ *H04W 4/24* (2013.01); *H04W 8/205* (2013.01); *H04W 48/16* (2013.01)

(58) Field of Classification Search
CPC ....... H04W 4/24; H04W 48/16; H04W 8/205; H04M 15/41; H04M 15/61
See application file for complete search history.

(56) References Cited

U.S. PATENT DOCUMENTS 6,044,403 A 3/2000 Gerszberg et al.
7,103,351 B2 9/2006 Chaudhari et al.
8,000,459 B1 8/2011 Partovi et al.
8,073,810 B2 12/2011 Maes
8,831,561 B2 9/2014 Sutaria et al.
10,715,996 B1 7/2020 Singh et al.
11,558,802 B2 1/2023 Soliman et al.
11,792,725 B2 10/2023 Soliman et al.
12,342,267 B2 * 6/2025 Kalra .................... H04W 60/04
2002/0178252 A1 11/2002 Balabhadrapatruni et al.
(Continued)

FOREIGN PATENT DOCUMENTS

CN 108564273 A 9/2018
CN 112243264 B 11/2023
(Continued)

*Primary Examiner* — William G Trost, IV
(74) *Attorney, Agent, or Firm* — Ashurst Perkins Coie US LLP

(57) ABSTRACT

A computer-implemented method for providing network slice connections in a telecommunications network includes receiving a request from a developer application to connect a user device associated with an enterprise level customer to a network slice. The request includes a client identifier and a device identifier. The method includes determining whether the user device is authorized to connect to the network slice based on the client identifier and the device identifier. The method includes identifying a particular billing system that is associated with the enterprise level customer. The method includes provisioning a service code to a customer profile of the enterprise level customer in the particular billing system. The method includes causing the developer application to connect the user device to the network slice. The method includes causing the developer application to bill utilization of the service feature to the enterprise level customer in the particular billing system.

20 Claims, 6 Drawing Sheets

(56) References Cited

U.S. PATENT DOCUMENTS

| | | | | |
|---|---|---|---|---|
| 2002/0199182 | A1 | 12/2002 | Whitehead | |
| 2003/0005112 | A1 | 1/2003 | Krautkremer | |
| 2006/0149845 | A1 | 7/2006 | Malin et al. | |
| 2009/0299788 | A1 | 12/2009 | Huber et al. | |
| 2010/0325018 | A1 | 12/2010 | Borelli et al. | |
| 2011/0111729 | A1 | 5/2011 | Poltorak et al. | |
| 2011/0137772 | A1 | 6/2011 | Davis et al. | |
| 2019/0058798 | A1* | 2/2019 | Lentz | H04W 4/24 |
| 2023/0189131 | A1* | 6/2023 | Huang | H04W 28/0268<br>370/328 |
| 2024/0064133 | A1* | 2/2024 | Ahmed | H04W 4/60 |
| 2025/0071090 | A1* | 2/2025 | Christofi | H04L 41/40 |

FOREIGN PATENT DOCUMENTS

| | | | | | |
|---|---|---|---|---|---|
| EP | 2286569 | A1 | | 2/2011 | |
| KR | 100469083 | B1 | | 2/2005 | |
| WO | 2005001641 | A2 | | 1/2005 | |
| WO | 2008085206 | A2 | | 7/2008 | |
| WO | 2017072784 | A1 | | 5/2017 | |
| WO | WO-2020098598 | A1 | * | 5/2020 | H04W 24/08 |
| WO | 2020177497 | A1 | | 9/2020 | |
| WO | 2020247677 | A1 | | 12/2020 | |

* cited by examiner

PROVIDING BILLING SYSTEM AGNOSTIC ON-DEMAND NETWORK SLICING

BACKGROUND

Network slicing is a technique used in 5G networks to create multiple virtual networks on a shared physical infrastructure. A network slice can be tailored to specific requirements and use cases. Network slicing can allow network operators to allocate dedicated resources and optimize performance for different services. By isolating these virtual networks, network slicing ensures that the performance and security of one slice does not impact others. Network slicing is useful for applications that require high reliability and low latency (e.g., remotely and autonomously driven vehicles, augmented reality/virtual (AR/VR) devices, medical devices, and security systems).

BRIEF DESCRIPTION OF THE DRAWINGS

Detailed descriptions of implementations of the present invention will be described and explained through the use of the accompanying drawings.

Figure 1:
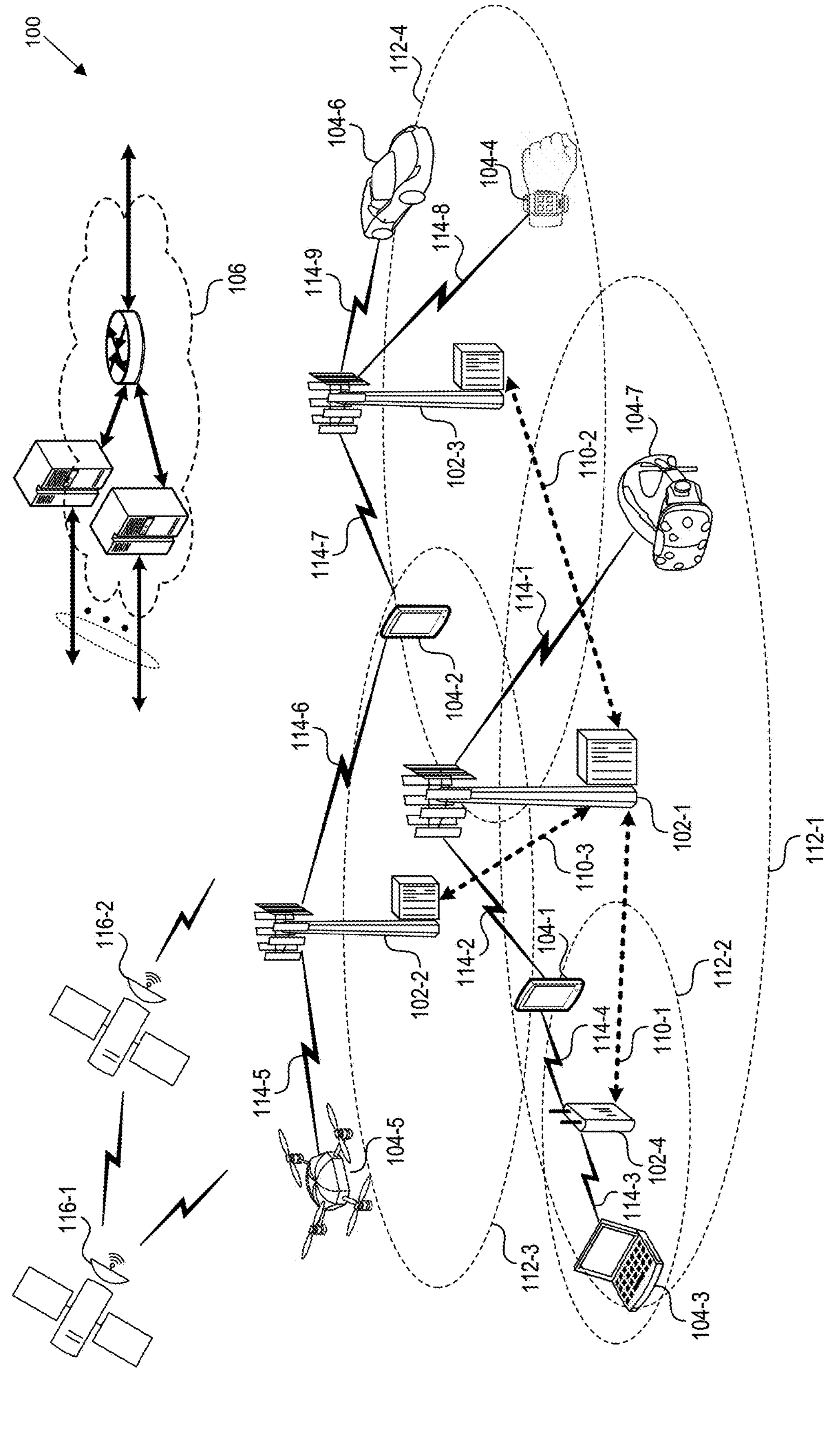
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for a method and system for on-demand network slicing connections for user devices associated with enterprise level customers (e.g., enterprise level subscribers) of a telecommunications network service provider. Generally, a network service provider can use different billing systems to bill their services to different enterprise level customers. Each enterprise level customer has a customer profile (or a customer account) that defines which services are available for use equipment associated with the enterprise level customer. On-demand services (e.g., services offered on-the-go, as needed), such as providing on-demand network slicing connections, require changes to the available services thereby requiring changes to the customer profiles. Such changes need to be performed in real time or in near real time in order to provide the service quickly when needed. Therefore, there is a need for billing system agnostic methods and systems for changing customer profiles of enterprise level customers and enabling establishment of on-demand network slices. Further, such changes should not interrupt other operations provided by the network service provider (e.g., revenue assurance, fraud prevention, accounting, and legal requirements).

Such billing system agnostic methods for enabling on-demand changes in customer profiles can be beneficial for opening opportunities for third party software developers to provide applications to enterprise level customers associated with devices that require reliable, uninterrupted network communication (e.g., remotely operated or autonomous vehicles). An application by a third party can be configured to detect network congestion for such a device and trigger request for connecting the device to a network slice. The enterprise level customer can be billed for the time the device is connected to the network slice through the agnostic billing system.

In some implementations, a network operator provisions network slices to a developer (e.g., a software developer) that can provide enterprise level customers a service (e.g., a developer software application) for on-demand network slice connections. The developer application can provide a service of detecting conditions that would trigger a need for a network slice connection (e.g., a network congestion or interruption experienced by a user device associated with an enterprise level customer). The developer application can change a customer profile of the enterprise level customer in a relevant billing system so that the user device can be connected to the network slice and the service can be billed through the relevant billing system.

In one example, a computer-implemented method for providing network slice connections on-demand in a telecommunications network includes receiving a request from a developer application by a Network as a Service (NaaS) runtime engine associated with the telecommunications network. The request can be to connect a user device associated with an enterprise level customer to a network slice. The request can include a client identifier of the enterprise level customer and a mobile station international subscriber directory number (MSISDN) of the user device. The method can include determining by the NaaS runtime engine whether the user device is authorized to connect to the network slice based on the client identifier and the MSISDN. In response to a determination that the user device is authorized to connect to the network slice, the method can include identifying by the NaaS runtime engine a particular billing system of multiple billing systems that is associated with the enterprise level customer based on the client identifier and the MSISDN. The method can include provisioning by the NaaS runtime engine a service code to a customer profile of the enterprise level customer in the particular billing system. The service code can enable access by the user device to a service feature of the telecommunications network via the network slice. The method can include causing the developer application to connect the user device to the network slice. The method can include causing the developer application to bill utilization of the service feature to the enterprise level customer in the particular billing system.

In another example, a network service platform associated with a telecommunications network receives from a software application a request to connect a user device associated with an enterprise level customer to a network slice. The request can include a client identifier of the enterprise level customer and a device identifier of the user device. The network service platform can determine whether the user device is authorized to connect to the network slice based on the client identifier and the device identifier. In response to a determination that the user device is authorized to connect to the network slice, the network service platform can identify a particular billing system of multiple billing systems that is associated with the enterprise level customer based on the client identifier and the device identifier. The network service platform can provision a service code to a customer profile of the enterprise level customer in the particular billing system. The service code can enable access by the user device to a service feature of the telecommunications network via the network slice. The network service platform can cause the software application to connect the user device to the network slice and bill utilization of the service feature to the enterprise level customer in the particular billing system.

In yet another example, a network service platform associated with a telecommunications network receives, from a software application, a request to connect a user device associated with an enterprise level customer to a network slice. The request can include a client identifier of the enterprise level customer and a device identifier of the user device. The network service platform can determine whether the user device is authorized to connect to the network slice based on the client identifier and the device identifier. In response to a determination that the user device is authorized to connect to the network slice, the network service platform can identify a particular billing system of multiple billing systems that is associated with the enterprise level customer based on the client identifier and the device identifier. The network service platform can provision a service code to a customer profile of the enterprise level customer in the particular billing system. The service code can enable access by the user device to a service feature of the telecommunications network via the network slice. The network service platform can cause the software application to connect the user device to the network slice and bill utilization of the service feature to the enterprise level customer in the particular billing system.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
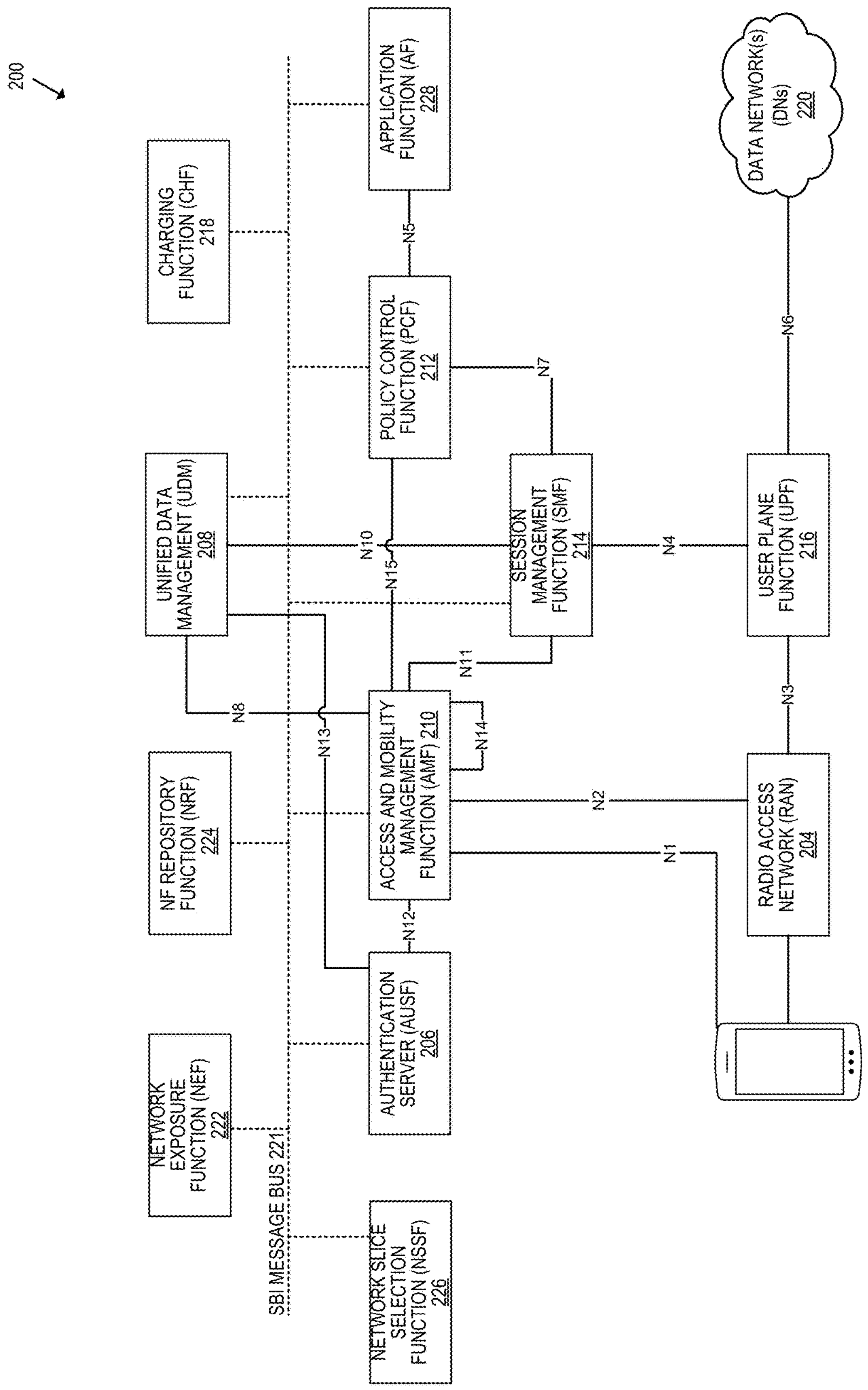
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Network Slicing System

Figure 3:
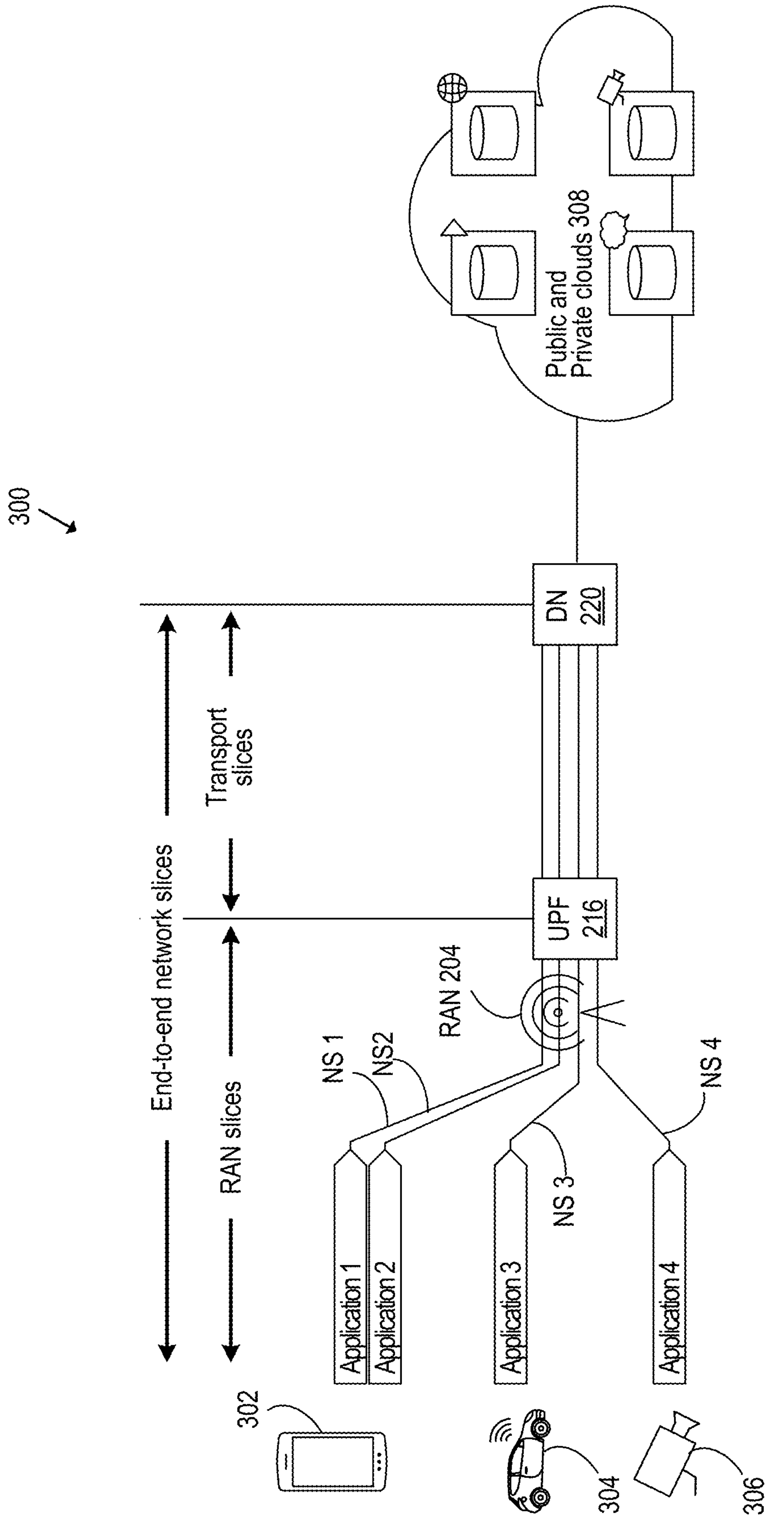
FIG. 3 is a block diagram that illustrates an example network slicing system in a 5G network.

FIG. 3 is a block diagram that illustrates an example network slicing system 300 in a 5G network. The network slicing system 300 enables multiplexing of virtualized and independent logical networks (i.e., network slices NS1 through NS2) on the same physical network infrastructure. In 5G wireless networks, network slicing assumes a central role designed to efficiently embrace multiple services with very different service-level requirements (e.g., data transfer speed, reliability, bandwidth). The end-to-end network slices can be defined between wireless devices (e.g., wireless devices 302, 304, and 306) and DN 220. For example, each network slice is an isolated end-to-end network tailored to fulfill diverse requirements requested by a particular application (e.g., wireless applications 1 through 4 associated with the wireless devices 302, 304, and 306). The network slicing system 300 can be in communication with public and private clouds 308. For example, the clouds 308 can include cloud servers associated with the different wireless applications 1 through 4.

An infrastructure associated with the network slicing system includes hardware and software resources, such as user equipment and/or compute-, storage- and networking-hardware equipment, as well as the services and software programs stored thereof. The infrastructure can be used to implement physical network nodes and/or to define a distributed cloud environment, such as Physical Network Functions (PNFs) and/or the Network Functions Virtualization Infrastructure (NFVI). The infrastructure provides the support and management functionality that allows for the deployment and operation of individual network slices. The network function/logical network stratum 303 includes a collection of PNFs. It provides the user control and application plane functionality across the different network segments, including the RAN slices between wireless devices (e.g., wireless devices 302, 304, and 306) and the UPF 216 and transport slices between the UPF 216 and DN 220.

On-Demand Network Slice Connections

Figure 4:
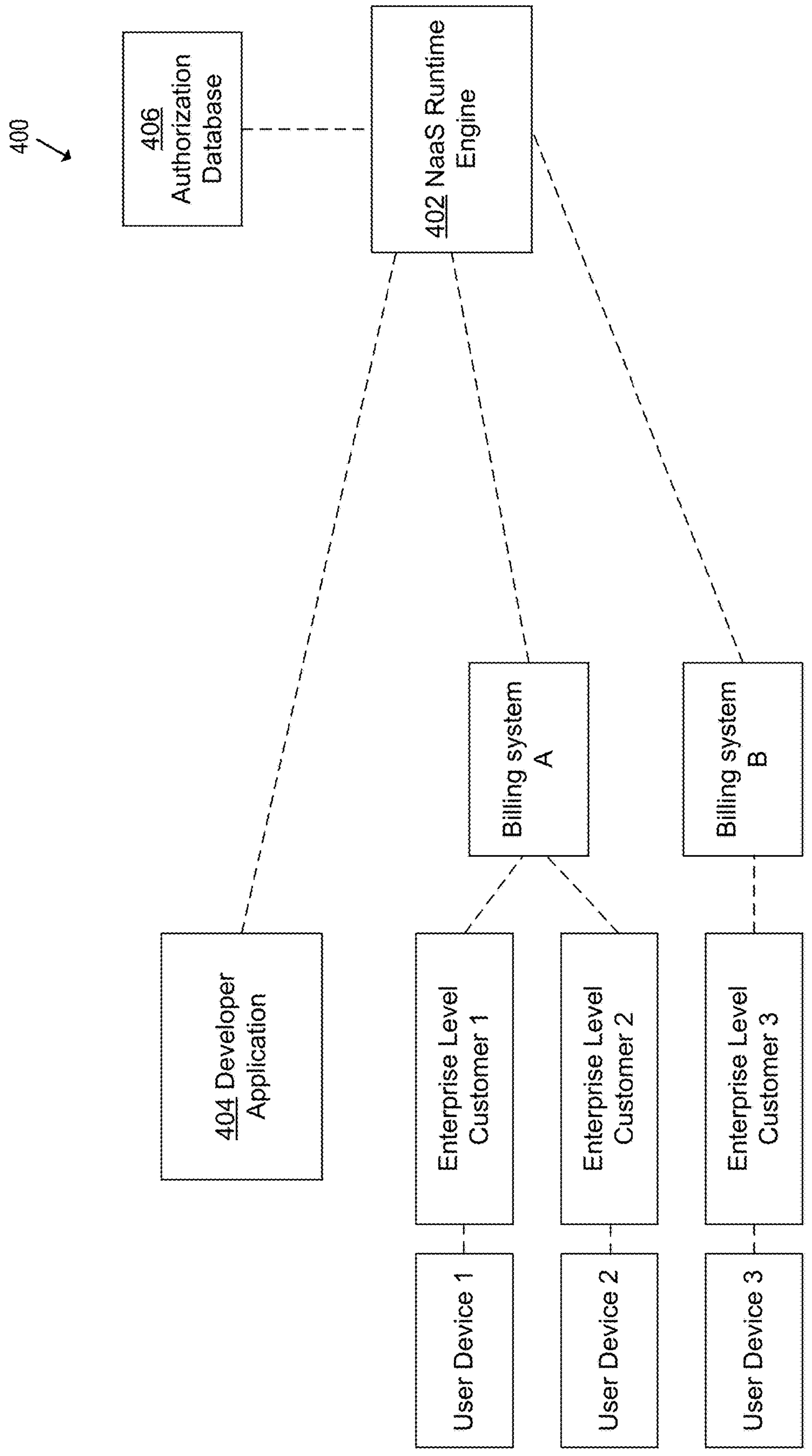
FIG. 4 is a block diagram that illustrates a system for providing on-demand network slice connections.

FIG. 4 is a block diagram that illustrates a system 400 for providing on-demand network slice connections. The system 400 is associated with, or in communication with, a telecommunications network (e.g., the network 100 in FIG. 1). The system 400 includes a NaaS (e.g., a network service platform) runtime engine 402, a developer application 404, an authorization database 406, multiple enterprise level customers (e.g., enterprise level customers 1, 2, 3) associated with user device (e.g., user device 1, 2, 3) and multiple billing systems (e.g., billing system A and B).

NaaS can refer to a cloud-based service model for management and operation of network infrastructure through a subscription-based service. The NaaS runtime engine 402 can be a software component associated with NaaS for executing and operating the applications to facilitate NaaS services. The enterprise level customers 1, 2, and 3 are customers of the network service provider and are in communication with the NaaS runtime engine 402 that manages the subscriptions of the enterprise level customers 1, 2, and 3. The services facilitated by the NaaS runtime engine 402 to the enterprise level customers 1, 2, and 3 are billed through the billing systems A and B. The enterprise level customers 1, 2, and 3 are associated with the user device 1, 2, and 3, respectively. Each of user device 1, 2, and 3 includes one or more devices or hardware used by an end user of the network service to access the network.

The network service provider can use the NaaS runtime engine 402 for managing subscriptions (e.g., customer profiles associated with subscriptions) and billing associated with enterprise level customers (e.g., the enterprise level customers 1, 2, 3). The billing for the services can be performed through multiple billing systems (e.g., the billing systems A and B) associated with the different enterprise level customers. For example, in system 400, the NaaS runtime engine 402 manages subscriptions of the enterprise level customers 1 and 2 through the billing system A and subscriptions of the enterprise level customers 3 through the billing system B.

The developer application 404 can be associated with a service (e.g., a service application) to connect (and disconnect) user device to network slices on demand. The service would allow the user device 1, 2, and 3 to be connected to a network slice when they have a need for such connection. The enterprise level customer would pay for the service only for the time the network slice connection is established. This is in contrast to, e.g., a periodic contract or a pre-paid contract to connect to a network slice. The network service provider can provision (supply) one or more network slices to the developer application 404 thereby allowing the developer application 404 to provide the network slice connections. The authorization database 406 can include information of enterprise level customers and associated equipment that are authorized to user the on-demand network slice services facilitated by the developer application 404. The authorization database 406 can include, for example, a lookup table including client identifiers and equipment identifiers authorized to connect with the network slice on demand.

In some implementations, the developer application 404 is configured to detect network congestion or interruption experienced by a user device while the user device is connected to the network. The developer application can request the NaaS runtime engine 402 to connect the user device to a network slice for better reliability and bandwidth. The NaaS runtime engine 402 can determine whether the user device is authorized to connect with the network slice. This can be done using the client identifier associated with the enterprise level customer and the device identifier associated with the user device.

As an example, the user device 1, 2, and 3 can include devices incorporated in remotely or autonomously driven vehicles (e.g., cars, trucks, trains, drones, robots, or planes). The wireless connections are needed in order to operate the remote or autonomously driven vehicles. The enterprise level customers 1, 2, and 3 can be rental or leasing companies that provide such remotely or autonomously driven vehicles to end users (e.g., drivers). The developer application 404 can be an application operating on the vehicles or in association with the vehicles that can detect network congestion and interruptions experienced by the user device 1, 2, and 3. Once the developer application 404 detects a congestion and determines that a user device (e.g., user device 1) would benefit from connecting to a network slice, the developer application 404 can send a request to the NaaS runtime engine 402. The NaaS runtime engine 402 can determine whether the user device 1 is authorized to connect to the network slice based on the information stored at the authorization database 406. In an instance that the user device 1 is authorized to connect to the network slice, the NaaS runtime engine 402 can upgrade a customer profile associated with the enterprise level customer 1 on the billing system A to include the service of the network slice connection for user device 1. In response to the customer profile upgrade, the developer application 404 can enable the user device 1 to be connected to the network slice. The enterprise level customer 1 (or alternatively the end user of the user device 1) can be billed for the time the user device 1 connects to the network slice through the billing system A. The described process of the on-demand network slice connection can be implemented in real time or nearly real time so that the operation of the remotely or autonomously driven vehicle is not significantly interrupted.

As further examples, the user device 1, 2, and 3 can include devices implemented in medical equipment (e.g., medical IoT) devices or medical robots), public and private safety equipment, AR/VR devices, industrial robotics, large networks of devices (e.g., networks of IoT devices), irrigation devices (e.g., for farming), and authentication devices (e.g., for banking or other services requiring high security user authentication.

Figure 5:
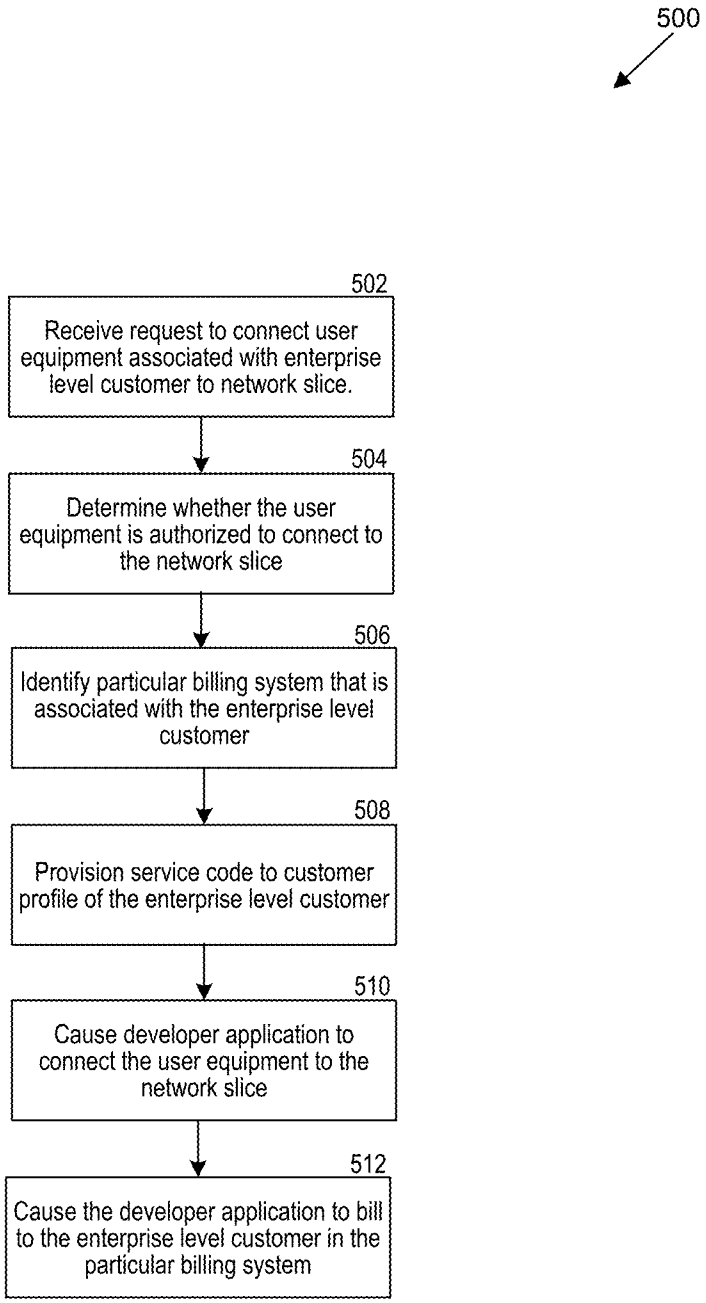
FIG. 5 is a flow diagram that illustrates processes for providing on-demand network slice connections.

FIG. 5 is a flow diagram that illustrates processes 500 for providing on-demand network slicing in a telecommunications network. The processes 500 can be performed by a system (e.g., the system 300 in FIG. 3) associated with a telecommunications network (e.g., the network 100 in FIG. 1). The system can include a network service platform (e.g., the NaaS runtime engine 402 in FIG. 4) and a software application (e.g., the developer application 404). The system can include at least one hardware processor and at least one non-transitory memory storing instructions (e.g., a computer system 600 described with respect to FIG. 6). When the instructions are executed by the at least one hardware processor, the server performs the processes 500.

At 502, the NaaS runtime engine receives a request from a developer application. The request can be to connect a user device (e.g., the user device 1, 2, or 3 in FIG. 4) associated with an enterprise level customer (e.g., the enterprise level customer 1, 2, or 3) to a network slice. The request can include a client identifier of the enterprise level customer and an MSISDN of the user device. The enterprise level customers 1, 2, and 3 can be customers of the network service provider and/or the developer application. For example, the enterprise level customer is a subscriber of the telecommunications network so that the user device associated with the enterprise level customer is connected to the telecommunications network. The client identifier is unique to the enterprise level customer so that each of the enterprise level customers 1, 2, and 3 is associated with a unique client identifier.

The MSISDN is a unique device identifier used for connecting a device to a telecommunications network. The MSISDN can include a country code (CC), a national destination code (NDC) and a subscriber number (SN). Each of the user device 1, 2, and 3 is associated with a unique MSISDN identifier. In some implementations, the request of the developer application includes another type of identifier that is unique to the user device. Examples of user device identifiers can include IMSI (International Mobile Subscriber Identity), IMEI (International Mobile Equipment Identity), TMSI (Temporary Mobile Subscriber Identity), MSRN (Mobile Station Roaming Number), MIN (Mobile Identification Number), MDN (Mobile Directory Number), and ICCID (Integrated Circuit Card Identifier).

In some implementations, the user device is associated with a remotely driven vehicle or an autonomously driven vehicle (e.g., the vehicles with wireless connectivity 104-6 vehicles in FIG. 1). In some implementations, the request is received in response to a determination that the user device is experiencing network congestion by the developer application. For example, the developer application can be a software application configured to detect network connectivity of user devices implemented on a remotely driven vehicle or an autonomously driven vehicle. In response to a determination that a user device is experiencing a network congestion or an interruption that could affect the operation of the vehicle, the developer application transmits a request to the NaaS runtime engine to request for the user device to be connected to a network slice. The network slice can provide a reliable network connectivity.

At 504, the NaaS runtime engine determines whether the user device is authorized to connect to the network slice based on the client identifier and the MSISDN. In some implementations, determining whether the user device is authorized to connect to the network slice includes performing a lookup at an authorization database (e.g., the authorization database). The authorization database includes client identifiers and MSISDNs that are authorized to use network slices. The authorization can be based on a preliminary agreement between the network service provider (and/or the developer application) and an enterprise level customer. For example, the enterprise level customer can provide a list of MSISDNs associated with devices that the enterprise level customer wants to authorize to use the on-demand network slice service.

In some implementations, prior to receiving the request, the NaaS runtime engine receives from the multiple billing systems (e.g., the billing systems A and B associated with enterprise level customers 1, 2, and 3 in FIG. 4) client identifiers associated with multiple enterprise level customers. The client identifiers can include the client identifier associated with the enterprise level customer. The NaaS runtime engine can receive from the multiple enterprise level customers sets of MSISDNs authorized to connect with network slices. The sets of MSISDNs can include a set having the MSISDN included in the request. The NaaS runtime engine can form the authorization database (e.g., the authorization database 406) including the received client identifiers and sets of MSISDNs. The NaaS runtime engine can determine whether the user device is authorized to connect to a particular network slice by performing a lookup at the authorization database based on the MSISDN and the client identifier.

In some implementations, the multiple billing systems provides the client identifiers and sets of MSISDNs to a network provisioning engine which then stores the client identifiers and sets of MSISDNs to the authorization database. A network provisioning engine can be a system used to manage and automate the setup, configuration, and maintenance of telecommunications network services (e.g., the network 100 in FIG. 1) for its customers.

In some implementations, the determination is made while the user device is operating and connected to the network. In such way, the network slice connection can be provided as an on-demand service that is available for the user devices while they are experiencing network congestion and have a need for a more reliable network connection.

In response to a determination that the user device is authorized to connect to the network slice, at 506 the NaaS runtime engine can identify a particular billing system of multiple billing systems that is associated with the enterprise level customer based on the client identifier and the MSISDN. The particular billing system can be used by a network operator of the telecommunications network to charge the enterprise level customer for a user device using the telecommunications network via the use of the developer application.

For example, an enterprise level customer is a subscriber of the network service provider and the financial transactions (e.g., billing including sending invoices and paying the invoices) between the network service provider and the customer that go through a particular billing system. In FIG. 4, the enterprise level customers 1 and 2 are associated with the billing system A and the enterprise level customer 3 is associated with the billing system B.

Different billing systems include different ways of associating services with customer profiles. Generally, billing systems can associate service codes (or service identifiers) with different services and customer profiles including service codes that the customer is authorized to use. For example, if a subscription of an enterprise level client includes five different services, a customer profile of the enterprise level client would include service codes associated with those five services.

In some implementations, the particular billing system is associated with a first type of service code that determines availability of network services. Another billing system can be associated with a second type of service code that determines availability of network services. A first customer profile can be associated with the first type of service code and be different from a second customer profile associated with the second type of service code. The second type of service code can be different from the first type of service code.

At 508, the NaaS runtime engine can provision (or add) a service code to a customer profile of the enterprise level customer in the particular billing system. The service code can operate as an indication that the user device associated with the enterprise level customer is authorized to use the service identified by the service code. The service code can enable access by the user device to a service feature of the telecommunications network via the network slice.

At 510, the NaaS runtime engine can cause the developer application to connect the user device to the network slice. The NaaS runtime engine can provide an indication to the developer application that the developer application can facilitate connecting the user device to the network slice.

At 512, the NaaS runtime engine can cause the developer application to bill utilization of the service feature to the enterprise level customer in the particular billing system. The billing can occur through the NaaS runtime engine associated with the telecommunications network. For example, the use of the network slice is billed by the network service provider through the billing system based on information received from the developer application. In some implementations, the developer application can bill the enterprise level customer through the billing system.

In some implementations, the enterprise level customer is being charged for the use of the network slice based on a time period the user device is connected to the network slice. In some implementations, in response to a determination by the developer application that the user device is no longer experiencing network congestion or that the user device is no longer operated, the NaaS runtime engine receives an indication from the developer application that the user device is disconnected from the network slice. The NaaS runtime engine can update the customer profile to remove the service code and disable connecting the user device to the network slice. For example, the NaaS runtime engine removes the service code provisioned at 508 from the customer profile of the enterprise level customer. Because connecting to the network slice has a higher price than connecting to the regular 5G network, it is beneficial that the enterprise level customer can receive the service by paying for the service only for the time that the user device is using the network slice connection.

In some implementations, the NaaS runtime engine provisions the developer application to connect devices associated with multiple enterprise customers with one or more networks slices to improve network quality prior to receiving the request from the developer application. The multiple enterprise customers can include the enterprise level customer.

Computer System

Figure 6:
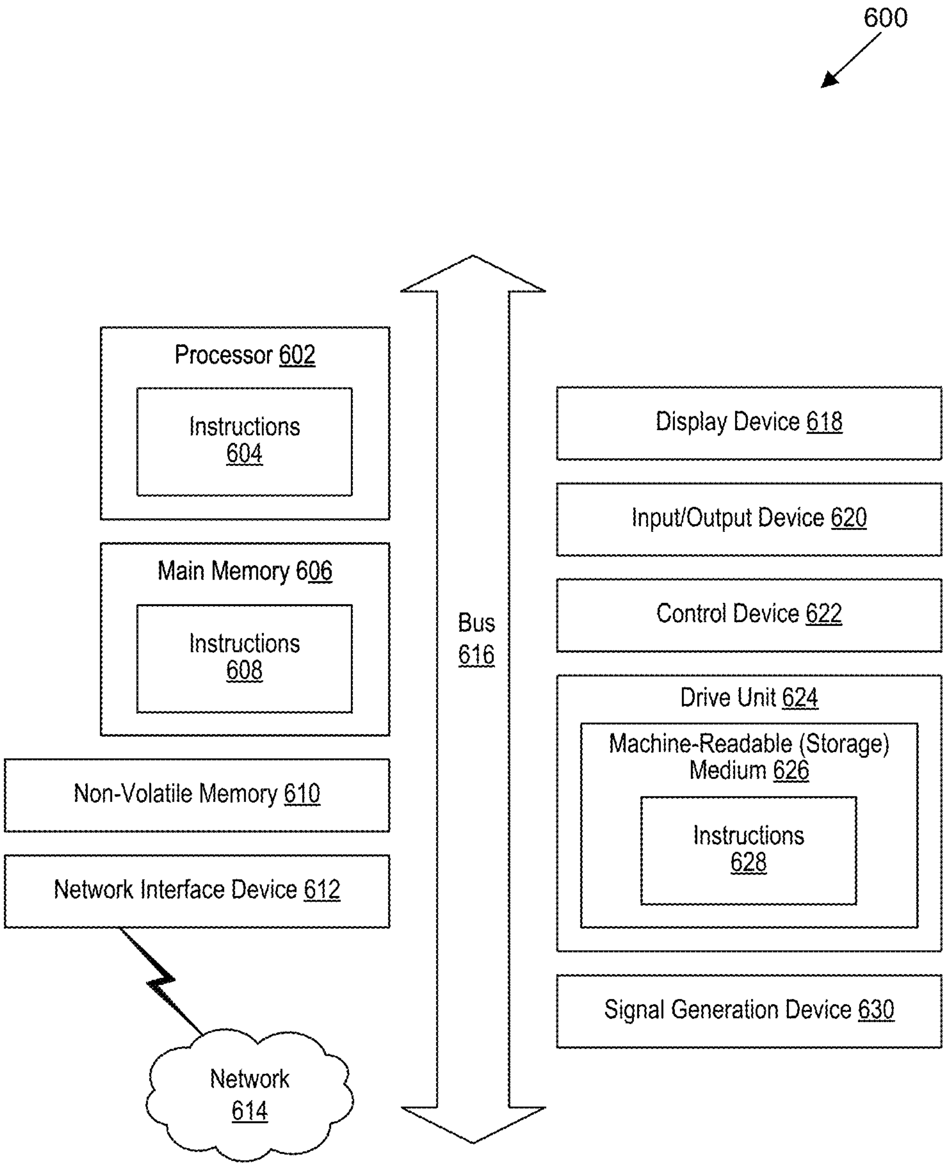
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real time, near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-implemented method for providing network slice connections on demand in a telecommunications network, the method comprising:

receiving, from a developer application by a Network as a Service (NaaS) runtime engine associated with the telecommunications network, a request to connect a user device associated with an enterprise level customer to a network slice, wherein the request includes a client identifier of the enterprise level customer and a mobile station international subscriber directory number (MSISDN) of the user device;

determining, by the NaaS runtime engine, whether the user device is authorized to connect to the network slice based on the client identifier and the MSISDN, in response to a determination that the user device is authorized to connect to the network slice:

identifying, by the NaaS runtime engine, a particular billing system of multiple billing systems that is associated with the enterprise level customer based on the client identifier and the MSISDN;

provisioning, by the NaaS runtime engine, a service code to a customer profile of the enterprise level customer in the particular billing system, wherein the service code enables access by the user device to a service feature of the telecommunications network via the network slice; and causing the developer application to connect the user device to the network slice and bill utilization of the service feature to the enterprise level customer in the particular billing system.

2. The computer-implemented method of claim 1, wherein determining whether the user device is authorized to connect to the network slice includes performing a lookup at an authorization database, and wherein the authorization database includes client identifiers and MSISDNs that are authorized to use network slices.

3. The computer-implemented method of claim 1, further comprising:

prior to receiving the request, receiving, from the multiple billing systems, client identifiers associated with multiple enterprise level customers, the client identifiers including the client identifier associated with the enterprise level customer, receiving, from the multiple enterprise level customers by the NaaS runtime engine, sets of MSISDNs authorized to connect with network slices, the sets of MSISDNs including a set having the MSISDN; and forming, by the NaaS runtime engine, an authorization database including the received client identifiers and sets of MSISDNs, wherein determining whether the user device is authorized to connect to a particular network slice includes performing a lookup at the authorization database.

4. The computer-implemented method of claim 1, further comprising, prior to receiving the request from the developer application, provisioning, by a server of the telecommunications network, the developer application to connect user devices associated with multiple enterprise customers with one or more network slices to improve network quality;

wherein the multiple enterprise customers include the enterprise level customer.

5. The computer-implemented method of claim 1, wherein the enterprise level customer is a subscriber of the telecommunications network, and wherein the particular billing system is used by a network operator of the telecommunications network to charge the enterprise level customer for user devices using the telecommunications network via the use of the developer application.

6. The computer-implemented method of claim 1, wherein the enterprise level customer is being charged for use of the network slice based on a time period the user device is connected to the network slice.

7. The computer-implemented method of claim 1, wherein the user device is associated with a remotely driven vehicle or an autonomously driven vehicle.

8. The computer-implemented method of claim 1, further comprising:

receiving, from the developer application by the NaaS runtime engine, an indication that the user device is disconnected from the network slice; and updating, by the NaaS runtime engine, the customer profile to remove the service code and disable connecting the user device to the network slice.

9. The computer-implemented method of claim 1, further comprising:

in response to a determination by the developer application that the user device is no longer experiencing network congestion or that the user device is no longer operated, receiving, from the developer application by the NaaS runtime engine, an indication that the user device is disconnected from the network slice.

10. The computer-implemented method of claim 1, wherein the particular billing system is associated with a first type of service codes that determine availability of network services;

wherein another billing system is associated with a second type of service codes that determine availability of network services; and wherein a first customer profile is associated with the first type of service codes and is different from a second customer profile associated with the second type of service codes different from the first type of service codes.

11. The computer-implemented method of claim 1, wherein the request is received in response to a determination, by the developer application, that the user device is experiencing network congestion.

12. The computer-implemented method of claim 1, wherein the determination is made while the user device is operating and connected to the network.

13. A non-transitory, computer-readable storage medium comprising instructions recorded thereon, wherein the instructions, when executed by at least one data processor of a network service platform associated with a telecommunications network, cause the network service platform to:

receive, from a software application by the network service platform, a request to connect a user device associated with an enterprise level customer to a network slice, wherein the request includes a client identifier of the enterprise level customer and a device identifier of the user device;

determine, by the network service platform, whether the user device is authorized to connect to the network slice based on the client identifier and the device identifier, in response to a determination that the user device is authorized to connect to the network slice:

identify, by the network service platform, a particular billing system of multiple billing systems that is associated with the enterprise level customer based on the client identifier and the device identifier;

provision, by the network service platform, a service code to a customer profile of the enterprise level customer in the particular billing system, wherein the service code enables access by the user device to a service feature of the telecommunications network via the network slice; and cause the software application to connect the user device to the network slice and bill utilization of the service feature to the enterprise level customer in the particular billing system.

14. The computer-readable storage medium of claim 13, wherein determining whether the user device is authorized to connect to the network slice includes performing a lookup at an authorization database, and wherein the authorization database includes client identifiers and device identifiers that are authorized to use network slices.

15. The computer-readable storage medium of claim 13, wherein the network service platform is further caused to:

prior to receiving the request, receive, from the multiple billing systems, client identifiers associated with multiple enterprise level customers, the client identifiers including the client identifier associated with the enterprise level customer, receive, from the multiple enterprise level customers by the network service platform, sets of device identifiers authorized to connect with network slices, the sets of device identifiers including a set having the device identifier; and form, by the network service platform, an authorization database including the received client identifiers and sets of device identifiers, wherein determining whether the user device is authorized to connect to a particular network slice includes performing a lookup at the authorization database.

16. The computer-readable storage medium of claim 13, further comprising, prior to receiving the request from the software application, provisioning, by the network service platform, the software application to connect user devices associated with multiple enterprise customers with one or more network slices to improve network quality;

wherein the multiple enterprise customers include the enterprise level customer.

17. A network service platform associated with a telecommunications network, the network service platform comprising:

at least one hardware processor, and at least one non-transitory memory storing instructions, which, when executed by the at least one hardware processor, cause the platform to:

receive, from a software application, a request to connect a user device associated with an enterprise level customer to a network slice, wherein the request includes a client identifier of the enterprise level customer and a device identifier of the user device;

determine whether the user device is authorized to connect to the network slice based on the client identifier and the device identifier, in response to a determination that the user device is authorized to connect to the network slice:

identify a particular billing system of multiple billing systems that is associated with the enterprise level customer based on the client identifier and the device identifier;

provision a service code to a customer profile of the enterprise level customer in the particular billing system, wherein the service code enables access by the user device to a service feature of the telecommunications network via the network slice; and cause the software application to connect the user device to the network slice and bill utilization of the service feature to the enterprise level customer in the particular billing system.

18. The network service platform of claim 17, wherein determining whether the user device is authorized to connect to the network slice includes performing a lookup at an authorization database, and wherein the authorization database includes client identifiers and device identifiers that are authorized to use network slices.

19. The network service platform of claim 17, wherein the network service platform is further caused to:

prior to receiving the request, receive client identifiers associated with multiple enterprise level customers, the client identifiers including the client identifier associated with the enterprise level customer, receive, from the multiple enterprise level customers by the network service platform, sets of device identifiers authorized to connect with network slices, the sets of device identifiers including a set having the device identifier; and form an authorization database including the received client identifiers and sets of device identifiers, wherein determining whether the user device is authorized to connect to a particular network slice includes performing a lookup at the authorization database.

20. The network service platform of claim 17, further caused to, prior to receiving the request from the software application, provision, by a network service platform of the telecommunications network, the software application to connect user devices associated with multiple enterprise customers with one or more network slices to improve network quality;

wherein the multiple enterprise customers include the enterprise level customer.

* * * * *